358-86. OR 3,835,244 SR

United States Patent [19] T358/86

Smart

[11] 3,835,244

[45] Sept. 10, 1974

[54] WIRED BROADCASTING SYSTEMS

[75] Inventor: Daniel Henry Smart, Morden, England

[73] Assignee: Communications Patents Limited, London, England

[22] Filed: Dec. 2, 1971

[21] Appl. No.: 204,144

[30] Foreign Application Priority Data

Dec. 2, 1970 Great Britain .................... 57310/70

[52] U.S. Cl............. 178/5.6, 178/DIG. 13, 325/308

[51] Int. Cl. ............................................ H04n 7/10

[58] Field of Search............... 178/DIG. 13, 5.6, 5.8; 325/308

[56] References Cited

UNITED STATES PATENTS

| | | | |
|---|---|---|---|
| 3,275,742 | 9/1966 | Quinton et al. | 178/DIG. 13 |
| 3,350,647 | 10/1967 | Gabriel et al. | 325/308 |
| 3,665,311 | 5/1972 | Gargini | 325/308 |
| 3,665,316 | 5/1972 | Jeffers | 325/461 |

OTHER PUBLICATIONS

Fink–Television Engineering Handbook–McGraw Hill–1957, pp. 1–4,1–5,2–5,2–6,2–11.

*Primary Examiner*—Robert L. Griffin
*Assistant Examiner*—Joseph A. Orsino, Jr.
*Attorney, Agent, or Firm*—Laurence R. Brown

[57] ABSTRACT

A wired television broadcasting system using television receivers designed for aerial reception has specific frequencies for vision and sound carriers to place the beat therebetween at a frequency rejected by the adjacent channel sound rejection characteristics of the television receivers.

6 Claims, 2 Drawing Figures

PATENTED SEP 10 1974 3,835,244

WIRED BROADCASTING SYSTEMS

Figures 1, 2:
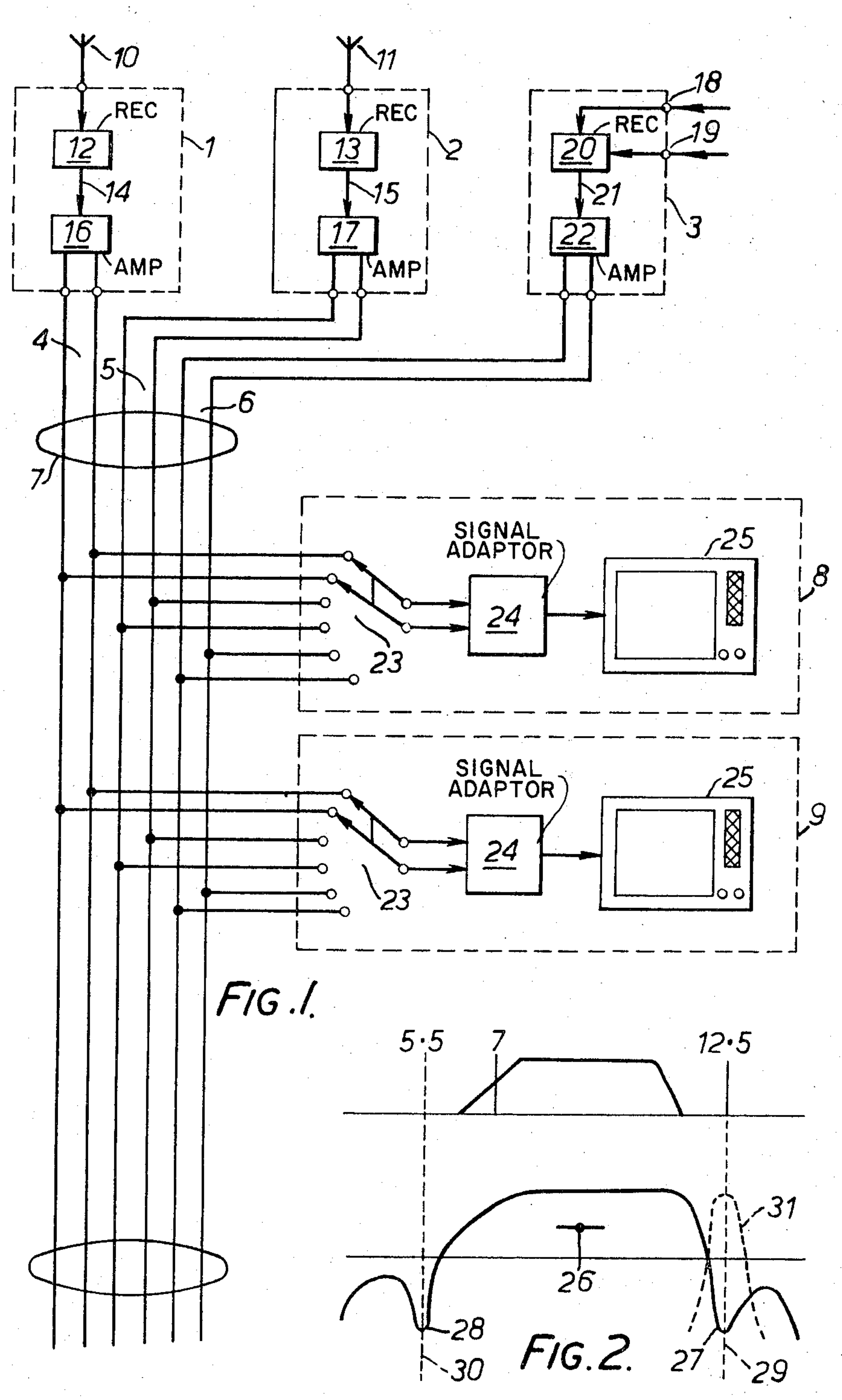

This invention relates to wired broadcasting systems in which at least the trunk distribution is effected in the high frequency band and seeks to provide an improved form thereof. The invention is particularly concerned with such high frequency wired broadcasting systems in which a significant proportion of receivers connected thereto are of a type adapted for the reception of radiated transmissions and which receive their input signals from the wired network through a signal adaptor.

According to the present invention there is provided a high frequency wired broadcasting system in respect of television signals in which the vision signal and the accompanying sound signal are transmitted as modulated carrier waves, the frequency spacing between said sound and vision carrier waves corresponds to the spacing adopted in respect of radiated transmissions in accordance with the television standard to which the television signals broadcast over said wired broadcasting system correspond and the frequency adopted for the vision carrier wave corresponds to the frequency difference between the vision carrier waves in adjacent channels allocated to radiated transmissions.

In order that the invention may be more fully understood a particular embodiment will now be described, by way of example only, with reference to the accompanying drawing in which:

FIG. 1 is a block schematic diagram of a wired broadcasting system in accordance with the present invention, and FIG. 2 is a diagram showing the frequency relationships which exist in the system shown in FIG. 1.

In the wired broadcasting system shown in FIG. 1 three sets of transmitting equipment 1, 2, 3 are arranged to apply sound and vision signals to corresponding pairs 4, 5, 6 of signal conductors which are contained within a common cable 7 which extends from said transmitting equipment to the premises of the subscribers two of which are indicated at 8 and 9 respectively. The sets of transmitting equipment 1 and 2 are arranged to broadcast over the wired network signals received from television transmitters radiating their signals. To this end each set of transmitting equipment is fed from a corresponding receiving aerial 10, 11 the signals from which are applied to a receiver 12, 13 which provides on its output line 14, 15 in respect of said received signals television signals suitable for application to the wired network. The signals on the output lines 14 and 15 are applied to corresponding amplifiers 16, 17 which provide at their outputs signals of an amplitude sufficient to energise the wired network. The transmitting equipment 3 is arranged to broadcast over said wired network television signals which are not obtainable as radiated transmission. The signals may be derived from a local studio associated with the wired broadcasting system, a telecine equipment or a video recorder. The vision and sound input signals are applied to the corresponding terminals 18, 19 from which they are fed to a modulator device 20 which provides on its output line 21 signals suitable for application to the wired network and of a type similar to those on the output line 14, 15 of the receivers 12, 13. Again the signals on the line 21 are applied to an amplifier 22 which amplifies them to a level suitable for application to the wired network.

Each subscriber's equipment 8, 9 comprises a programme selection switch 23 by means of which a signal adaptor 24 may have its input terminals connected to that pair of the wired broadcasting network which carries the signals desired by the subscriber. The signal adaptor 24 is effective to translate the signals on the wired broadcasting network to a frequency in the VHF or UHF range to which the subscribers television receiver 25 is responsive. These translated signals are applied to the television receiver by way of its aerial input socket.

In the case of television receivers designed for the aerial reception of radiated television signals the frequency response in the vision channel thereof is arranged to encompass the vision signal and to exhibit a relatively high rejection at the frequency corresponding to the accompanying sound signal and also to the frequency corresponding to the sound signal of the adjacent broadcast channel. In FIG. 2 this response is indicated by the portion 26 which encompasses the vision signal and the rejection notches 27, 28 at the frequency of the accompanying sound signal 29 and adjacent sound signal 30. The response of the sound channel of such a receiver is indicated by the line 31. It will be appreciated that these responses are defined by the selectivity of the intermediate frequency stages of the receiver.

The signals on the wired broadcasting network are arranged such that the frequency spacing between the sound and vision carrier waves correspond to the spacing adopted in respect of radiated transmissions for which the receivers 25 are designed so that after frequency translation by the signal adaptor the vision signal falls in the response 26 and the sound signal in the response 31. Due to non-linearities which unavoidably exist in amplifiers 16, 17, 22 and any repeater amplifiers which may be necessary between the transmitting equipments 1, 2, 3 and the subscribers installations various spurious signals are generated the most important of which is at a frequency corresponding to the sound vision frequency spacing of the signals of said wired broadcasting network. This will result effectively in the production on said wired network of an additional unwanted signal. If the frequencies adopted for the signals broadcast over the wired network are suitably chosen it can be arranged that this spurious signal will when translated through the signal adaptor 24 fall in the null 28 of the vision response of the television receiver 25 and so will suffer greater attenuation than would otherwise be the case. Accordingly the frequencies adopted on the wired network for the vision and accompanying sound signals are so chosen that the spurious signal corresponding to the beat caused between them has a frequency when translated which corresponds to that of the adjacent channel sound signal for radiated transmissions.

In television systems operating in accordance with C.C.I.R. system codes B and C the sound/vision spacing is 5.5 MHz. and the frequency difference between vision carrier waves in adjacent channels allocated to radiated transmission is 7 MHz. Accordingly where receivers designed for the aerial reception of such transmissions are connected to the wired broadcasting network the frequency of the vision carrier thereon is arranged to be 7 MHz. and the frequency of the sound signal thereon is arranged to be 12.5 MHz. so that the spurious beat falls at a frequency of 5.5 MHz.

In television systems operating in accordance with C.C.I.R. system codes D, K and L the sound/vision spacing is 6.5 MHz. and the frequency difference between vision carrier waves in adjacent channels allocated to radiated transmission is 8 MHz. Accordingly where receivers designed for the aerial reception of such transmissions are connected to the wired broadcasting network the frequency of the vision carrier wave thereon is arranged to be 8 MHz. and, the frequency of the sound signal thereon is arranged to be 14.5 MHz. so that the spurious beat falls at a frequency of 6.5 MHz.

In television systems operating in accordance with C.C.I.R. system code E the sound/vision spacing is 11.15 MHz. and the frequency difference between vision carrier waves in adjacent channels allocated to radiated transmission is 14 MHz. Accordingly where receivers designed for the aerial reception of such transmissions are connected to the wired broadcasting network the frequency of the vision carrier wave thereon is arranged to be 14 MHz., and the frequency of the sound signal thereon is arranged to be 25.15 MHz. so that the spurious beat falls at a frequency of 11.15 MHz.

In television systems operating in accordance with C.C.I.R. system codes F, G and H the sound/vision spacing is 5.5 MHz. and the frequency difference between vision carrier waves in adjacent channels allocated to radiated transmission is 8 MHz. Accordingly where receivers designed for the aerial reception of such transmissions are connected to the wired broadcasting network the frequency of the vision carrier wave thereon is arranged to be 8 MHz., and the frequency of the sound signal thereon is arranged to be 13.5 MHz. so that the spurious beat falls at a frequency of 5.5 MHz.

In television systems operating in accordance with C.C.I.R. system code I the sound/vision spacing is 6 MHz. and the frequency difference between vision carrier waves in adjacent channels allocated to radiated transmission is 8 MHz. Accordingly where receivers designed for the aerial reception of such transmissions are connected to the wired broadcasting network the frequency of the vision carrier wave thereon is arranged to be 8 MHz. and the frequency of the sound signal thereon is arranged to be 14 MHz., so that the spurious beat falls at a frequency of 6 MHz.

In television systems operating in accordance with C.C.I.R. system codes M and N the sound/vision spacing is 4.5 MHz. and the frequency difference between vision carrier waves in adjacent channels allocated to radiated transmission is 6 MHz. Accordingly where receivers designed for the aerial reception of such transmissions are connected to the wired broadcasting network the frequency of the vision carrier wave thereon is arranged to be 6 MHz., and the frequency of the sound signal thereon is arranged to be 10.5 MHz., so that the spurious beat falls at a frequency of 4.5 MHz.

It will be appreciated that modest deviations from the carrier frequencies for the vision signal mentioned above may be made so that advantage may be taken of the beneficial effects with regard to the other distortions present in wired broadcasting systems of choosing the vision carrier wave frequency to have a particular relationship to the line or frame scanning frequency of the television signals.

What we claim is:

1. In a high frequency wired broadcasting system processing television signals in accordance with a predetermined standard in which the vision signal and the accompanying sound signal are transmitted as two separated modulated carrier waves and are received by receivers adapted to receive radiated aerial transmissions on selected channels and having traps to reject those aerial transmissions on adjacent channels, means establishing the frequency spacing between said sound and vision carrier waves to correspond to the spacing adopted for radiated transmissions in accordance with the said television standard for television signals broadcast over said wired broadcasting system and establishing the frequency adopted for the vision carrier wave so that the frequency difference between the vision and sound carrier waves lie in the adjacent channel traps rejecting radiated transmissions thereby to cause spurious beat signals between the sound and vision carriers to be rejected as adjacent channel signals.

2. A high frequency wired broadcasting system as claimed in claim 1, wherein the television transmissions thereon are in accord with C.C.I.R. systems B and C in which the sound/vision spacing is 5.5 MHz and the frequency difference between the vision carrier waves in adjacent channels allocated to radiated transmission is 7 MHz. and the frequency of the vision carrier wave is approximately 7 MHz. and the frequency of the sound carrier wave is approximately 12.5 MHz.

3. A high frequency wired broadcasting system as claimed in claim 1, wherein the television transmissions thereon are in accord with C.C.I.R. systems code E in which the sound/vision spacing is 11.15 MHz. and the frequency difference between the vision carrier waves in adjacent channels allocated to radiated transmission is 14 MHz. and the frequency of the vision carrier wave is approximately 14 MHz. and the frequency of the sound carrier wave is approximately 25.15 MHz.

4. A high frequency wired broadcasting system as claimed in claim 1, wherein the television transmissions thereon are in accord with C.C.I.R. systems codes F, G and H in which the sound/vision spacing is 5.5 MHz. and the frequency difference between the vision carrier waves in adjacent channels allocated to radiated transmission is 8 MHz. and the frequency of the vision carrier wave is approximately 8 MHz. and the frequency of the sound carrier wave is approximately 13.5 MHz.

5. A high frequency wired broadcasting system as claimed in claim 1, wherein the television transmissions thereon are in accord with C.C.I.R systems code I in which the sound/vision spacing is 6 MHz. and the frequency difference between the vision carrier waves in adjacent channels allocated to radiated transmission is 8 MHz. and the frequency of the vision carrier wave is approximately 8 MHz. and the frequency of the sound carrier wave is approximately 14 MHz.

6. A high frequency wired broadcasting system as claimed in claim 1, wherein the television transmissions thereon are in accord with C.C.I.R. systems codes M and N in which the sound/vision spacing is 4.5 MHz. and the frequency difference between the vision carrier waves in adjacent channels allocated to radiated transmission is 6 MHz. and the frequency of the vision carrier wave is approximately 6 MHz. and the frequency of the sound carrier wave is approximately 10.5 MHz.

* * * * *